Patented Nov. 29, 1949

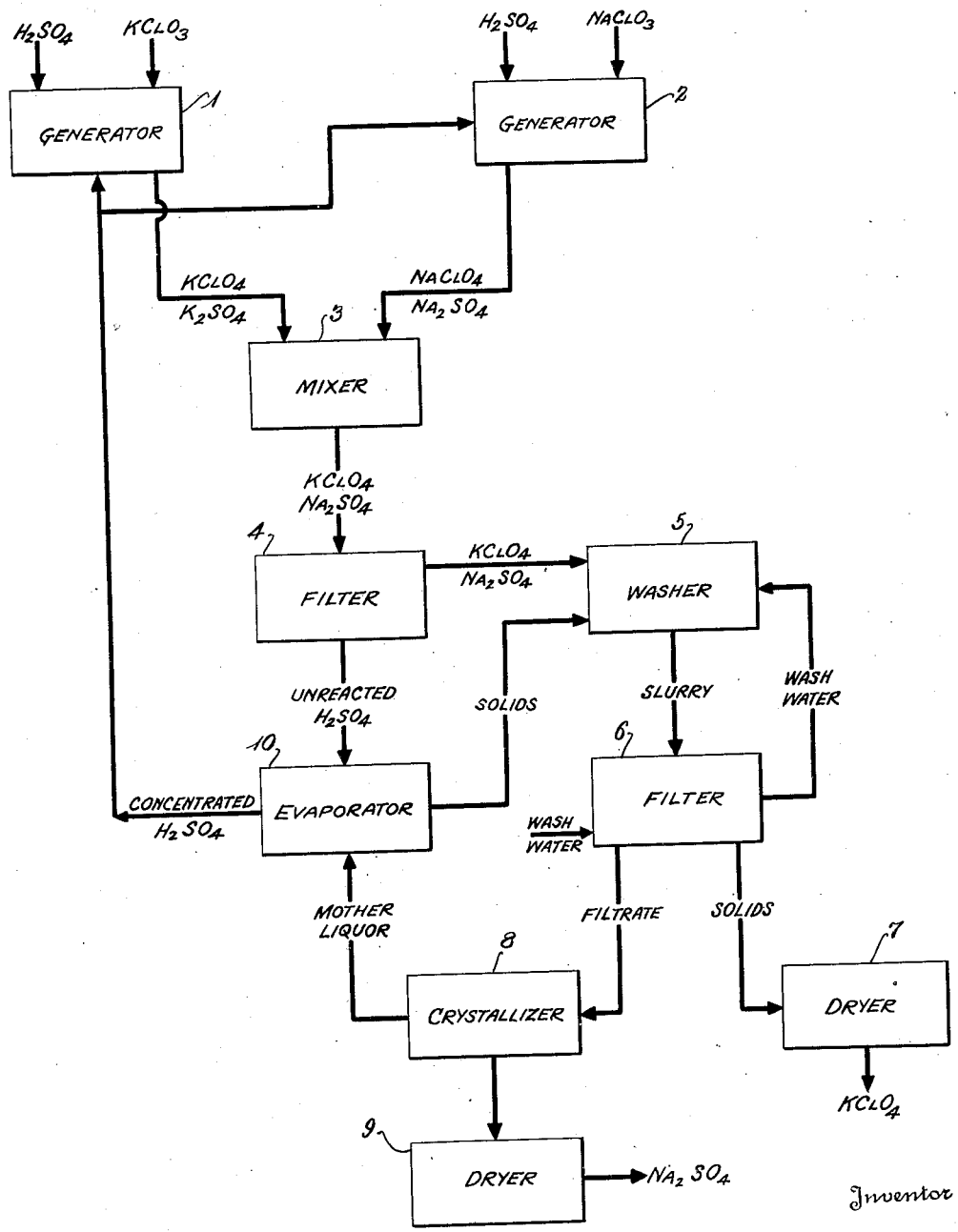

2,489,574

UNITED STATES PATENT OFFICE 2,489,574

PROCESS FOR THE PRODUCTION OF PERCHLORATES AND CHLORINE DIOXIDE

Clifford A. Hampel, Harvey, Ill., assignor to Cardox Corporation, Chicago, Ill., a corporation of Illinois Application April 2, 1946, Serial No. 659,042

7 Claims. (Cl. 23—85)

This invention relates to a new process for the production of a perchlorate and chlorine dioxide.

It is known that perchlorates may be manufactured commercially by processes which involve the electrolytic oxidation of chlorates. However, these processes are expensive because they require the use of platinum anodes and this material is considerably attacked during the process. Furthermore, a high capital investment is required to produce any material amount of perchlorate by this method because a single cell containing a platinum anode can produce only a relatively small amount of a perchlorate.

It is also known that chlorine dioxide can be produced commercially by the chemical reduction of a chlorate. This process, however, is expensive to carry out because the material which is utilized to bring about this reduction is itself oxidized to a generally useless product. For example, if sulfur dioxide is used to reduce a chlorate to chlorine dioxide, a sulfate is formed which has a very small value.

It is also known that chlorine dioxide can be produced by the oxidation of a chlorite. However, inasmuch as the chlorite which must be used in this process can only be produced commercially by the reduction of chlorine dioxide to the chlorite, it is apparent that this process is a wasteful one. The raw material which is utilized in such a process for making chlorine dioxide is one which can only be obtained commercially from the end product of this process.

It is also known that both a perchlorate and chlorine dioxide may be produced by a single process which involves the decomposition of a chlorate by a strong mineral acid other than an acid such as hydrochloric acid. A representative reaction according to this process is represented by the following equation:

(a) 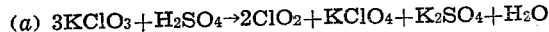
$3KClO_3 + H_2SO_4 \rightarrow 2ClO_2 + KClO_4 + K_2SO_4 + H_2O$

This process which involves the decomposition of a chlorate has the inherent disadvantage that only a portion of the metal which is introduced in the form of the chlorate appears as the desired perchlorate, the remainder of the metal appearing as a salt of the acid used to carry out the reaction. For example, from Equation a, it will be observed that only one-third of the potassium ion which is introduced appears in the form of the desired perchlorate. Inasmuch as the metal whose prechlorate is desired may be a relatively expensive one, such as potassium, it is costly to utilize the reaction represented by Equation a to produce potassium perchlorate.

It is, therefore, apparent that the several different processes of the prior art for producing a perchlorate and chlorine dioxide have not been entirely satisfactory. They have the common objection that they are expensive to carry out because they are wasteful of the materials or ingredients which they must employ.

An object of the invention is to provide a process by which a desired perchlorate and chlorine dioxide may be produced and which is not wasteful of the ingredients to be employed.

A further object of the invention is to provide a process for the production of a desired perchlorate and chlorine dioxide, which will result in the utilization of all the metal introduced for the formation of the perchlorate, in the formation of that perchlorate so that none of this material is lost in a less valuable product.

A still further object of the invention is to provide a process for the production of a desired perchlorate and chlorine dioxide, which employs relatively inexpensive materials, this being made possible by the employment of a chlorate other than the one which would be required if the process represented by Equation a were carried out.

Other objects and advantages of the invention will become apparent from the following disclosure:

In general, the process of the present invention involves the reaction represented by Equation a above. As has been pointed out, that process involves the decomposition of a chlorate by the use of a strong mineral acid other than an acid such as hydrochloric acid. The products formed by that process are a perchlorate, a salt product of the acid employed, and chloride dioxide. The metal of both the perchlorate and the salt product formed from the acid is the same metal as that of the chlorate which is decomposed. As has been pointed out, only one-third of this metal, however, appears in the perchlorate, the remaining two-thirds appearing in the salt product formed from the acid.

In accordance with the invention, none of the metal introduced into the system for appearing as the perchlorate will appear as this salt product formed from the acid. This result of the invention may be achieved by carrying out the process in two different, although related, manners. In the first mode of operation the chlorate which is employed is not that of the metal whose perchlorate is desired, the metal whose perchlorate is desired being introduced in the form of a salt. According to the second mode of carrying out the process of the invention, the chlorate of the metal whose perchlorate is desired is employed and substantially all of this metal is caused to appear as the perchlorate by the introduction into the system of another perchlorate.

Both of these modes of operation to carry out the invention have in common the fact that the added ingredients are introduced subsequent to the completion of the chlorate decomposition reaction and before any separation of their products has been effected. That the results of the present invention can be obtained by this subsequent addition of certain ingredients to the system, is surprising because of the large number of components which are in the system. It would be expected that due to the large number of components in the system, it would not be possible to obtain a definite set of products, but in carrying out the present invention, it has been found that the same high percentage of products is formed which would be formed if a prior separation had been carried out with respect to the products immediately resulting from the chlorate decomposition.

It has been stated that one mode of carrying out the process of the present invention is to first disintegrate a chlorate which does not have the metal of the desired perchlorate and, after this disintegration reaction is substantially completed, to then add a salt which contains the metal of the desired perchlorate. It may be pointed out here that an important advantage of this procedure is that a chlorate may be employed which is considerably less expensive than the chlorate which would have to be employed if the desired perchlorate were to be produced by the process represented by Equation $a$. For example, if it is desired to produce potassium perchlorate, instead of utilizing the relatively expensive potassium chlorate, the invention comprehends the employment of sodium chlorate for the production of the perchlorate ion.

After the chlorate has been substantially all consumed by this disintegration process, and before any separation is carried out, a potassium salt is added to these mixed reaction products and this will result in the formation of potassium perchlorate. These reactions are represented by the following equations:

(b) $3NaClO_3 + H_2SO_4 \rightarrow$
$NaClO_4 + Na_2SO_4 + 2ClO_2 + H_2O$ (c) $NaClO_4 + Na_2SO_4 + \frac{1}{2}K_2SO_4 \rightarrow$
$KClO_4 + 1\frac{1}{2}Na_2SO_4$ In Equation $b$, the sulfuric acid which is used is intended to be representative of any strong mineral acid other than an acid such as hydrochloric acid, sulfuric acid being employed for illustrative purposes. As examples of the other acids which may be employed, perchloric acid, phosphoric acid, nitric acid, fluosilicic acid, and hydrofluoric acid may be mentioned. Also, the process is not limited to the use of sodium chlorate as the chlorate which may be employed may be any one of the alkali metals, alkaline earth metals, and magnesium, the metal sodium being employed in Equation $b$ merely for illustrative purposes. It is also to be understood that the anion of the salt added in accordance with Equation $c$ need not be a sulfate ion and, moreover, it need not be the same anion as that of the acid employed to carry out the decomposition represented by the Equation $b$. Thus, if sulfuric acid is employed to carry out the chlorate disintegration reaction represented by Equation $b$, it is possible to use potassium nitrate, for example, to introduce the potassium ion.

It will be observed from Equations $b$ and $c$ that the amount of the salt which is added for the purpose of introducing the metal ion, whose perchlorate is desired, should be added in an amount equivalent to one-third of the chlorate which is consumed. By adding this relative quantity of the salt having the metal whose perchlorate is desired, its cation is present in an amount equivalent to the amount of perchlorate ion which is formed due to the disintegration of the chlorate employed. Thus, as would appear from a combination of Equations $b$ and $c$, all of the potassium ion and all of the perchlorate ion which is in the system will be combined to form potassium perchlorate.

None of the potassium introduced into the system will, therefore, appear in the form of a less expensive salt product from the acid and none of the perchlorate ion which is formed will carry with it a cation other than the potassium. It should be observed that the metal potassium has been referred to here as the metal of the desired perchlorate, for illustrative purposes only, as the invention may be practiced to produce a perchlorate of any of the alkali metals, alkaline earth metals or magnesium. Certain precautions must be observed, however, in obtaining certain perchlorates, in the selection of the ingredients. For example, the potassium ion should not be introduced into the system, if the perchlorate of some other metal is desired. Also, sulfuric acid should not be used if calcium or barium perchlorate is desired, but perchloric acid may be used.

In carrying out the second mode of operating the process of the invention, the chlorate is used of the metal whose perchlorate is desired, and, after the disintegration of this chlorate by an acid, a perchlorate of a different metal is added to the system. This perchlorate which is added to the system interacts with the products formed in the decomposition reaction and results in the formation of additional perchlorate of the metal whose perchlorate is desired. For example, if it is desired to obtain potassium perchlorate by the use of potassium chlorate, all of the potassium introduced into the system as the chlorate may be caused to appear as the perchlorate by adding sodium perchlorate in an amount equivalent to the salt product formed from the acid. This process takes place according to the following equations:

(d) $3KClO_3 + H_2SO_4 \rightarrow$
$KClO_4 + K_2SO_4 + 2ClO_2 + H_2O$ (e) $K_2SO_4 + KClO_4 + 2NaClO_4 \rightarrow 3KClO_4 + Na_2SO_4$ The acid employed in Equation $d$ need not be sulfuric acid to carry out this process, but may be any of the acids referred to in connection with Equation $b$. Likewise, it is not necessary to employ sodium in the perchlorate which is added to the system inasmuch as this may be any one of the metals referred to in connection with Equations $b$ and $c$. It is, furthermore, to be understood that the perchlorate which is desired may be that of any alkali metal, alkaline earth metal or magnesium, the corresponding chlorate being utilized in carrying out the process according to Equations $d$ and $e$. The precautions discussed above in reference to Equations $b$ and $c$, must, however, be observed.

It will appear from a combination of Equations $d$ and $e$ that all of the potassium introduced into the system as the chlorate appears in the perchlorate which is produced. Therefore, none of this metal is lost in the formation of the salt product of the acid employed to carry out the decomposition. This result is obtained by the introduction of an amount of perchlorate ion which is equivalent to two-thirds of the chlorate consumed.

One possible source of the perchlorate ion to be utilized in carrying out the process according to the mode represented by Equations $d$ and $e$, is the products resulting from carrying out a separate chlorate decomposition reaction. The products of this second chlorate decomposition reaction, after the reaction has proceeded to completion, are combined with the products resulting from the decomposition of the first chlorate. This is represented by the following equations:

(f) $6NaClO_3 + 2H_2SO_4 \rightarrow$
$\qquad 2NaClO_4 + 2Na_2SO_4 + 4ClO_2 + 2H_2O$ (g) $3KClO_3 + H_2SO_4 \rightarrow$
$\qquad KClO_4 + K_2SO_4 + 2ClO_2 + H_2O$ (h) $(2NaClO_4 + 2Na_2SO_4) + (KClO_4 + K_2SO_4) \rightarrow$
$\qquad 3KClO_4 + 3Na_2SO_4$ It will be observed from Equations $f$, $g$, and $h$ that half as much chlorate must be consumed in the one chlorate decomposition reaction [Equation $g$ above] in which is present the metal of the desired perchlorate, as the chlorate which is to be consumed in the second reaction [Equation $f$ above] to produce the additional required perchlorate ion. It is not necessary that the same acid be employed in carrying out the separate reactions represented by Equations $f$ and $g$ as different ones of the acids mentioned in connection with Equation $b$ may be employed. Also, as explained in connection with Equations $b$ and $c$, the process may be carried out employing any two different metals of the alkali metals, alkaline earth metals, or magnesium, the stated precautions as to the selection of the metals and acids being observed.

In these several modes of carrying out the process of the invention, the chlorates, or the chlorate and the salt, may be reacted with the acid either as solutions or in their solid forms. It is preferable that if they be reacted as solutions, they be in as strong a concentration as is possible so that the dilution of the acid will be minimized as much as possible.

The chlorine dioxide gas produced by this invention may be stored or used for any purpose where it is required. It is removed from the acidification operation by continuous passage of a gas which is inert with respect to chlorine dioxide through the reaction vessel. This gas may be, for example, air or nitrogen.

The inert gas not only serves as a means for removing the chlorine dioxide from the reactor as it is formed, but also serves to dilute the concentration of the chlorine dioxide. This is important because if the chlorine dioxide reaches a moderately high concentration, an explosion may occur. It has been found advisable to supply a sufficient amount of the diluent gas so that the chlorine dioxide will not reach a concentration much higher than about 5% by volume.

The temperature at which the process is conducted should be kept below about 70° C. Above this temperature, chlorine dioxide may begin to decompose thermally, although the decomposition temperature will vary with the concentration of the chlorine dioxide in the carrier gas, the lower the concentration, the higher the safe temperature limit. The reaction rate increases with increasing temperature, but above about 70° C. the reaction produces undesirable quantities of chlorine, the efficiency of chlorine dioxide generation being decreased thereby. The useful temperature range is from 0° C. to about 70° C., the rate being about four times as great at 60° C. as it is at 25° C.

The acid used for the chlorate decomposition may all be fresh acid or it may be in part reconcentrated acid derived by separating and concentrating the excess acid left after the chlorate decomposition has been completed. It is important that the acid be of high concentration and that there be an excess of acid over that required to stoichiometrically react with the chlorate. With a low acid concentration, the chlorate decomposition rate becomes so low as to be impractical. For example, if sulfuric acid is used, the reaction will nearly cease if the concentration is below 60%. As a consequence, there should be a sufficient initial excess of acid so that after all the added chlorate is consumed, the concentration of the acid will still be relatively high. As the reaction proceeds, considerable salt is precipitated and it may, therefore, be deemed advisable to effect a separation of these precipitated salts from the reaction mixture before the minimum concentration of acid is reached.

The action of the acid upon the chlorate to form chlorine dioxide and a perchlorate is not instantaneous. A considerable period of time must be allowed for the complete decomposition of the chlorate. For this reason, the preferred method of operation for the invention is to react the chlorate over a period of time so that the chlorine dioxide formation is continuous. The rate of chlorine dioxide formation is roughly proportional to the rate of addition of the chlorate to the acid, for example, if this be the mode of operation. For this reason, the process may be conducted, as a batch process, or as a continuous process. In the latter case, the chlorate could be reacted continuously and in the desired ratio to the required amount of acid in an appropriate continuously operating apparatus.

The minimum concentration of the acid to obtain effective results with the particular chlorate or chlorates to be decomposed may be readily determined. The lowest effective concentration varies with the temperature and consequently with higher temperatures, it is possible to use lower concentrations of acid.

If an acid, such as hydrochloric acid, is used, or if appreciable quantities of a chlorite salt, such as sodium chloride, are present in the chlorate used or are introduced to the system in any manner, the gaseous product will contain chlorine, as well as chlorine dioxide, the chlorine being formed according to the following equations, wherein the chlorate is represented as chloric acid:

(i) $\qquad 2HClO_3 + 10HCl \rightarrow 6Cl_2 + H_2O$
(j) $\qquad 2HClO_3 + 2HCl \rightarrow Cl_2 + 2ClO_2 + 2H_2O$ It is for this reason that this invention is concerned with the use of acids which do not form chlorine as does hydrochloric acid; the use of hydrobromic and hydroiodic acids is likewise undesirable.

It should be pointed out that it is possible to use a mixture of strong acids for the operation of the invention quite satisfactorily. In some cases, the use of mixed acids will make economies of operation possible. This is especially true if perchloric acid be one of the mixed acids, the perchlorate of the one metal added to the system being recovered substantially all in the form of the desired perchlorate while the other metal added to the system appears as the salt of the other one of the mixed acids. For example, if a mixture of sulfuric and nitric acids, commonly known as the "nitrating acid," is used, a metal sulfate and a metal nitrate may be recoverable from the other metal perchlorate. The nitrate and the sulfate can be processed, separated and sold individually, or it may be desirable to regenerate nitric acid from the nitrate salt by proper treatment with sulfuric acid, making it possible to recycle the nitric acid while only fresh sulfuric acid need be added to the operation for replacement purposes.

As has been mentioned above, an excess of acid is used for the decomposition of the chlorate or chlorates. Important economies are achieved if this excess acid can be reconcentrated and returned to the process after the salt products have been removed from it. In most cases, the salt products, including both the perchlorate and the salt of the acid, are precipitated from the acid medium long before the chlorate decomposition has been completed. This is due to the low solubility of salts in general in concentrated acids. Therefore, the excess acid can usually be separated from the salt products of the reaction by atmospheric or centrifugal filtration, the thus separated acid being reconcentrated and returned to the decomposition operation along with the necessary fresh acid to replace the acid consumed by the operation.

The perchlorate desired and the salt of the other metal are separated by utilization of the mutually different solubilities of the definite compounds in aqueous solutions. The separation of the various products, including the acid carried physically by the solid products will entail the use of such common chemical engineering unit operations as evaporation, crystallization, washing and filtration.

In those cases in which potassium is one of the metals introduced into the system, it will appear principally as potassium perchlorate. As it is quite insoluble, it may easily be separated from the salt of the acid. However, if the salt of the acid be such a compound as calcium sulfate, for example, the potassium perchlorate, being much more soluble than calcium sulfate, can be separated by the addition of sufficient water to dissolve all of the potassium perchlorate. As another example of the separation of products, if the metals introduced into the chlorate decomposition operation are sodium and barium, the barium sulfate which is formed is more insoluble than the sodium perchlorate which is formed, and addition of water to the salt mixture will dissolve all of the sodium perchlorate to remove it from the barium sulfate.

It will be understood that the barium and sodium ions may both be introduced as chlorates in their separate acidification reactions, or one may be introduced as a chlorate and the other as a salt. Because in most cases the two metal ions will be so selected that they have different solubilities in the form of their respective products, no great difficulty will be experienced in separating the products from each other. The question of whether the perchlorate or the salt of the acid is the more insoluble is readily determined.

This invention is further explained by the following example illustrated in the drawing:

In the generator 1 is combined 122.5 grams of potassium chlorate and an excess amount of 85% sulfuric acid at a temperature above room temperature but below about 65° C. In a separate generator 2 is combined 213 grams of sodium chlorate and an excess amount of 85% sulfuric acid at approximately the same temperature. These two separate reactions are allowed to continue until all of the chlorate in each generator is decomposed. The chlorine dioxide formed in the generators 1 and 2 is removed from the generators by the continuous passage of sufficient air through them to keep the chlorine dioxide concentration in the exit gases at about 30 mm. Hg. partial pressure.

After these two separate decomposition reactions have been substantially completed, they are combined into one vessel here represented at 3. It will be appreciated, however, that the contents of one of the generators may be directly poured into the other generator in order to obtain the desired intermixing of their products. It is to be observed that this intermingling of the contents of the generator 1 and of the contents of the generator 2 occurs without having effected a prior separation of the ingredients in either one of these generators.

The intermixed contents of the generators 1 and 2 are allowed to remain together for a short period of time, and they are, thereafter, delivered to the filter 4. In the filter 4, the solid potassium perchlorate and the sodium sulfate appear as the filter cake, and the unreacted sulfuric acid appears in the filtrate. These solids in the filter cake are treated in washer 5 with sufficient water to dissolve all of the sodium sulfate. Slurry from the washer 5, consisting of solid potassium perchlorate in a solution of sodium sulfate and sulfuric acid, is filtered in filter 6 to separate the potassium perchlorate. The potassium perchlorate from filter 6 may be dried in dryer 7 to a solid product.

Sufficient wash water is used in filter 6 to remove substantially all of the sodium sulfate and sulfuric acid adhering to the potassium perchlorate crystals. This wash water from filter 6 is used in washer 5 to supply all or part of the water required there to dissolve the sodium sulfate.

The filtrate from filter 6 is cooled in crystallizer 8 to precipitate sodium sulfate decahydrate. This hydrated sodium sulfate may be dried in dryer 9 to form anhydrous sodium sulfate. The liquid from the crystallizer 8 is concentrated in evaporator 10 along with the unreacted sulfuric acid in the filtrate from filter 4 and this concentrated sulfuric acid is reused in the generators 1 and 2. Solids which are formed in the evaporator 10 are fed to the washer 5 for reworking. It will be necessary to add fresh acid to the generators 1 and 2 along with the concentrated sulfuric acid delivered from evaporator 10. The quantity of this fresh acid which must be added is equivalent to the sodium sulfate removed from the process in dryer 9.

Related subject matter is disclosed in my co-pending cases as follows: Ser. No. 647,403, filed February 13, 1946, directed to perchlorate production; Ser. Nos. 647,404, filed February 13, 1946, and 659,043, filed April 2, 1946, directed to the production of chlorates and chlorites; Ser. No. 647,396, filed February 13, 1946, directed to the production of perchlorates and involving the production of chlorates; and Ser. Nos. 736,113, filed March 20, 1947, 756,542, 756,543, and 756,544, filed June 23, 1947, directed to the separation of salts in salt systems containing a chlorate and a chlorite.

Having thus described the invention, I claim:

1. The process for producing a perchlorate and chlorine dioxide, which comprises reacting a strong mineral acid other than hydrochloric acid and a chlorate whose metal is selected from the class consisting of potassium, sodium, lithium, calcium, barium, strontium, and magnesium, and after the reaction is substantially completed, combining the reaction products without separation thereof with a salt whose metal is selected from said class, but which is different from the metal of the chlorate, whereby substantially all of one of the metals introduced appears as the perchlorate, said acid being so selected that the anion thereof does not form an insoluble compound with the metal whose perchlorate is desired, and said chlorate and said salt being so selected that no potassium is present when a perchlorate other than potassium is desired.

2. The process for producing a perchlorate and chlorine dioxide, which comprises reacting a strong mineral acid other than hydrochloric acid and a chlorate whose metal is selected from the class consisting of potassium, sodium, lithium, calcium, barium, strontium, and magnesium, and after the reaction is substantially completed, combining the reaction products without separation thereof with a salt whose metal is selected from said class, but which is different from the metal of the chlorate, whereby the metal of the salt appears as the perchlorate product, said acid being so selected that the anion thereof does not form an insoluble compound with the metal whose perchlorate is desired, and said chlorate and said salt being so selected that no potassium is present when a perchlorate other than potassium is desired.

3. The process for producing a perchlorate and chlorine dioxide, which comprises reacting a strong mineral acid other than hydrochloric acid and a chlorate whose metal is selected from the class consisting of potassium, sodium, lithium, calcium, barium, strontium, and magnesium, and after the reaction is substantially completed, combining the reaction products without separation thereof with a salt whose metal is selected from said class, but which is different from the metal of the chlorate, whereby substantially all of the metal of the salt appears as the perchlorate product, said salt being introduced in an amount equivalent to one-third of the chlorate consumed, said acid being so selected that the anion thereof does not form an insoluble compound with the metal whose perchlorate is desired, and said chlorate and said salt being so selected that no potassium is present when a perchlorate other than potassium is desired.

4. The process for producing a perchlorate and chlorine dioxide, which comprises reacting a strong mineral acid other than hydrochloric acid and a chlorate whose metal is selected from the class consisting of potassium, sodium, lithium, calcium, barium, strontium, and magnesium, and after the reaction is substantially completed, combining the reaction products without separation thereof with a perchlorate whose metal is selected from said class, but which is different from the metal of the chlorate, whereby the metal of the introduced chlorate appears as the metal combined with the introduced perchlorate ion, said acid being so selected that the anion thereof does not form an insoluble compound with the metal whose perchlorate is desired, and said chlorate and introduced perchlorate being so selected that no potassium is present when a perchlorate other than potassium is desired.

5. The process for producing a perchlorate and chlorine dioxide, which comprises reacting a strong mineral acid other than hydrochloric acid and a chlorate whose metal is selected from the class consisting of potassium, sodium, lithium, calcium, barium, strontium, and magnesium, and after the reaction is substantially completed, combining the reaction products without separation thereof with a perchlorate whose metal is selected from said class, but which is different from the metal of the chlorate, whereby the metal of the introduced chlorate appears as the metal combined with the introduced perchlorate ion, the perchlorate which is introduced into the process being in an amount equivalent to two-thirds of the chlorate which is consumed, said acid being so selected that the anion thereof does not form an insoluble compound with the metal whose perchlorate is desired, and said chlorate and introduced perchlorate being so selected that no potassium is present when a perchlorate other than potassium is desired.

6. The process for producing a perchlorate and chlorine dioxide, which comprises reacting a strong mineral acid other than hydrochloric acid and a chlorate whose metal is selected from the class consisting of potassium, sodium, lithium, calcium, barium, strontium, and magnesium, and after the reaction is substantially completed, combining the reaction products without separation thereof with the reaction products of a strong mineral acid other than hydrochloric acid and a chlorate whose metal is a different one selected from the said class, whereby a major portion of the metal associated with one of the chlorates appears as the perchlorate and the metal introduced with the other chlorate appears as the metal of the salt formed from the acid, said acids being so selected that the anions thereof do not form insoluble compounds with the metal whose perchlorate is desired, and said chlorates being so selected that no potassium ion is present when a perchlorate other than potassium is desired.

7. The process for producing a perchlorate and chlorine dioxide, which comprises reacting a strong mineral acid other than hydrochloric acid and a chlorate whose metal is selected from the class consisting of potassium, sodium, lithium, calcium, barium, strontium, and magnesium, and after the reaction is substantially completed, combining the reaction products without separation thereof with the reaction products of a strong mineral acid other than hydrochloric acid and a chlorate whose metal is a different one selected from the said class, whereby a major portion of the metal associated with one of the chlorates appears as the perchlorate and the metal introduced with the other chlorate appears as the metal of the salt formed with the acid, the chlorate whose metal is to appear as the perchlorate being introduced in an amount equivalent to one-half the chlorate of the other metal, said acids being so selected that the anions thereof do not form insoluble compounds with the metal whose perchlorate is desired, and said chlorates being so selected that no potassium ion is present when a perchlorate other than potassium is desired.

CLIFFORD A. HAMPEL.

No references cited.